United States Patent [19]

Frazier et al.

[11] 4,197,109
[45] Apr. 8, 1980

[54] DOGHOUSE AND FEEDER ENCLOSURE FOR GLASS FURNACE

[75] Inventors: John E. Frazier; Clifford F. Crouse, both of Washington, Pa.

[73] Assignee: Frazier-Simplex, Inc., Washington, Pa.

[21] Appl. No.: 961,996

[22] Filed: Nov. 20, 1978

[51] Int. Cl.² .............................................. C03B 3/00
[52] U.S. Cl. ......................................... 65/335; 65/27
[58] Field of Search ................... 65/335, 27; 432/242; 34/242

[56] References Cited

U.S. PATENT DOCUMENTS

| | | | |
|---|---|---|---|
| 2,284,398 | 5/1942 | Kutchka | 65/335 X |
| 3,495,966 | 2/1970 | West | 65/335 |
| 3,563,522 | 2/1971 | Blackman | 34/242 X |
| 3,780,889 | 12/1973 | Frazier et al. | 65/335 X |
| 3,900,282 | 8/1975 | Seeburger | 432/242 X |
| 4,004,903 | 1/1977 | Daman et al. | 65/335 |
| 4,036,625 | 7/1977 | Holmes et al. | 65/335 X |

FOREIGN PATENT DOCUMENTS 1083511  2/1969  Fed. Rep. of Germany ............. 65/335

*Primary Examiner*—Robert L. Lindsay, Jr.
*Attorney, Agent, or Firm*—Parmelee, Miller, Welsh & Kratz

[57] ABSTRACT

To retard the escape of hot gases and dust from batch material being charged from a mechanical batch feeder into the doghouse at the charging end of a glass melting furnace, there is provided an enclosure comprised of two sections, one of which is supported on the side walls of the furnace over the doghouse area and which is closed at its back above the doghouse by the suspended arch wall of the furnace, the other of said enclosure sections being entirely supported on the batch feeder. It has top and end portions, the edges of which confront the top and edges of the furnace supported section when the feeder is in place to deliver batch material to the doghouse. Packing material forms a seal between said confronting edges. The feeder, however, may be quickly moved away from the furnace in case of need or emergency or for the repair of the furnace or the feeder. The back of the feeder mounted enclosure section is comprised partly of parts of the feed hopper with the batch material in the hopper forming a part of the enclosure. A flexible heat resistant fabric below the charger plate of the feeder and connected to the undersurface thereof is important in blocking the escape of gases and dust from the interior of the enclosure by flowing from the doghouse area under the charger plate, said curtain also being attached to the ends of the feeder supported section with sufficient fullness in the curtain between the charger plate and the end walls to flex with the back and forth and tilting motion of the charger plate relative to said end walls of the feeder supported section.

9 Claims, 9 Drawing Figures

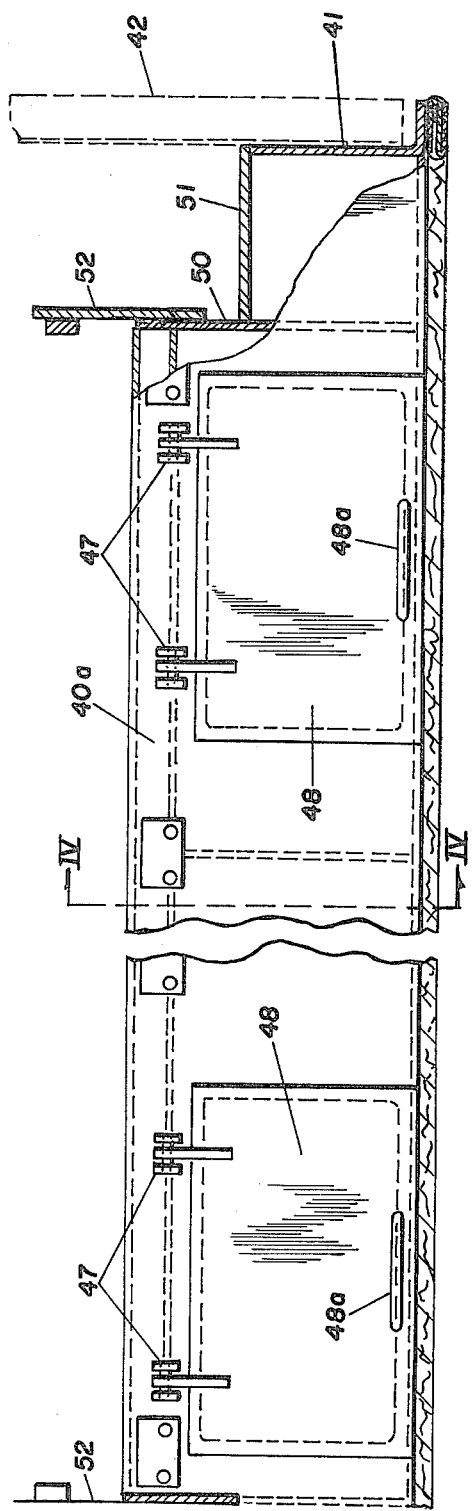
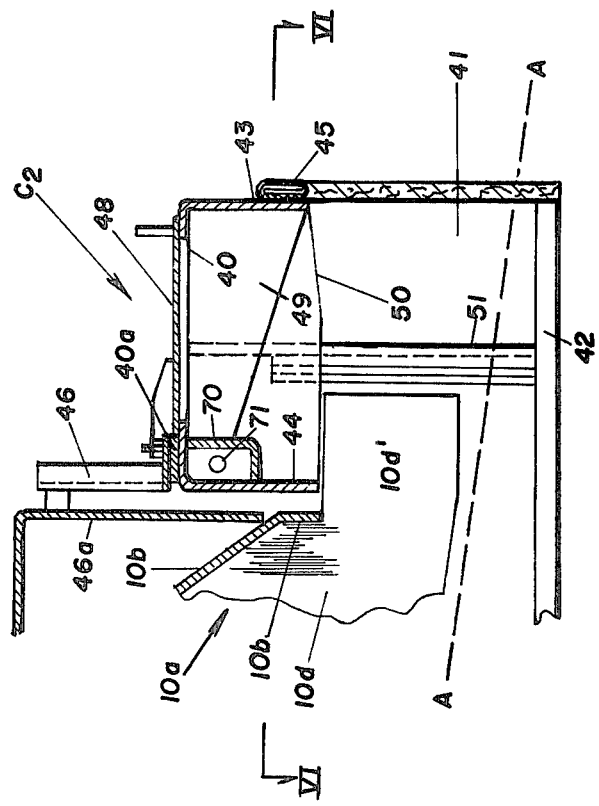
Fig. 3
Fig. 5

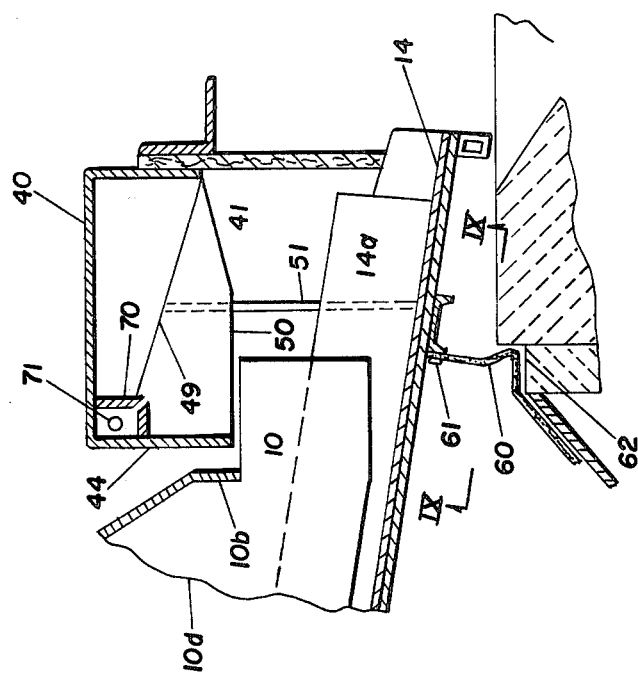
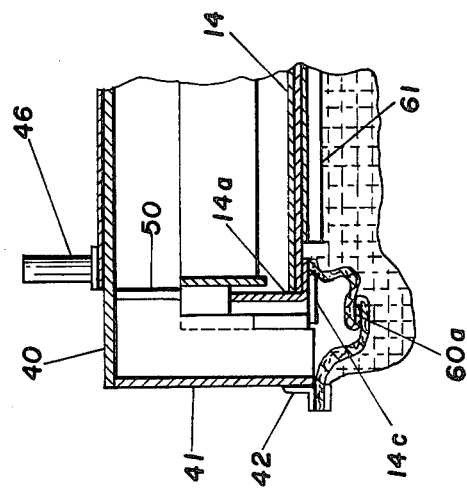

DOGHOUSE AND FEEDER ENCLOSURE FOR GLASS FURNACE

This invention relates to the feeding of raw glass batch mixtures into glass melting furnaces and is for an attachment for use on glass batch feeders, and especially blanket type feeders as disclosed, for example, in our U.S. Pat. No. 3,780,889 dated Dec. 25, 1973.

Continuous glass melting furnaces comprise a large, generally rectangular tank over which is a firing zone. The batch mixture is charged into the rear end structure of the furnace and it first melts and remains melted until it is eventually discharged at the forehearth constituting the opposite end of the tank.

The back wall of the tank extends only part way to the full height of the furnace and the level of molten glass in the tank extends close to but not to the full height of this back wall. There is a suspended arch extending downwardly from the roof at the rear end of the tank spaced inwardly from the back wall with its lower edge spaced above the level of the molten glass. This portion of the furnace is commonly referred to in the art as the "doghouse" (presumably so called from the low rear extension of the back wall of the furnace above the tank with a low opening through which the batch material enters the furnace) and provides a downwardly open area above the level of the molten glass into which the mixture of glass forming ingredients or batch is charged, usually by a feeder of some kind. The batch material initially floats on the molten glass but, as it moves forward, it melts. With a batch feeder of the type disclosed in said U.S. Pat. No. 3,780,889, the feeder has a charger plate that reciprocates over the exposed area of the furnace tank in the direction of the length of the furnace. The charger plate is positioned beneath a hopper, the arrangement being such that as the charger plate moves forward from its retracted limit of travel, batch material from the hopper is deposited in a layer on the charger plate while the nose comprising the forward edge of this plate pushes the previously deposited layer of the floating batch that has not yet melted under the suspended arch of the furnace into the melting zone. At the forward limit of its travel, the charger plate, which has been sloping downwardly, is raised to a level or more nearly level position where the nose of said plate is well above the level of the molten glass. Then, as the charger plate moves rearwardly, the layer of batch material then on the charger plate is obstructed at the hopper from being carried back with said plate and is crowded off to fall over the nose of the charger plate into the open area of the furnace from which the previous charge has just been cleared. This cycle is continuously repeated to maintain a substantially constant level of molten glass in the furnace as the melt is removed at the forehearth.

There are two difficulties with feeders of this type, the first of which arises from the great loss of heat and escape of hot gases from the charging end of the furnace resulting not only in waste of energy but which may cause much discomfort to workers in the area, and more serious is the loss of dust-like batch materials into the ambient air and its pollution of the surrounding environment.

It should be recognized that the feeders, which in most cases are quite massive, are nevertheless mobile to permit removal or replacement and afford access for repair of the feeders or access to the furnace. The present invention provides a separable enclosure section secured to the charging end of the furnace and a second section secured to the feeder with the two sections in confronting abutting relation to function as a single unit during the time that the feeder is in an operative position at the charging end of the furnace. If the charger plate were fixed like a simple chute leading from a hopper over the back wall of the tank, an enclosure could be quite simply constructed. However, since the charger plate oscillates up and down and back and forth, as previously mentioned, and in part of its forward travel the terminal of the charger plate for pushing the charge on the forward stroke is just above the surface of the molten glass but below the top of the back wall of the tank, while at the forward limit of travel this end of the charger plate then raises and retracts at a level to clear the rear wall of the tank, together with the need to protect the mechanism of the feeder from blowback of the intensely hot gases and dust, and nevertheless provide access to the interior of the enclosure if, for some reason, the transfer of material from the hopper to the feeder into the charge receiving end of the furnace is irregular or impeded, the provision of a reasonably satisfactory enclosure, so far as we are aware, has not heretofore been accomplished.

Briefly stated, the present invention provides not only a separable enclosure comprised of two sections, one on the furnace over the doghouse and a second section secured to the feeder wherein the two sections abut to function as a unitary enclosure, but wherein the two sections accommodate the back and forth and up and down travel of the charger plate. The section which is mounted on the feeder is provided with seals to minimize the escape of dust and fine particles at the rear of the enclosure where the charger plate passes through the enclosure and wherein the hopper and batch material in the hopper also cooperate to restrict the outflow of gases and dust from the back of said section when it is positioned on the feeder. Important also is the provision of a flexible refractory curtain attached to the underside of the charger plate and also to the enclosure and provide a seal against the escape to any appreciable extent in the space under the charger plate and over the back wall of the tank of the furnace, this curtain being designed to fold and unfold with the back and forth and up and down motion of the charger plate.

The invention may be more fully understood by reference to the accompanying drawings, wherein:

FIG. 3 is a top plan view of the section of the enclosure to be mounted on the feeder but showing it apart from the feeder and wth the top portion of one rear corner in section but on a larger scale.

FIG. 5 is a transverse section also in the plane of line IV—IV of FIG. 3 but with the enclosure member of FIG. 3 in position at the front end of the feeder but with the feed gates at the front of the hopper removed, and with the charger plate also being omitted, the approximate level of the bottom of the charger plate, however, being indicated by a dotted line.

FIG. 8 is a view somewhat similar to FIG. 5 but showing the charger plate in side elevation and with a flexible heat resistant fabric curtain under the charger plate and gathered in folds on a ledge at the outer face of the rear wall of the glass tank.

FIG. 9 is a staggered vertical section in about the plane of line IX—IX of FIG. 8 showing the pleat-like fold in the side portion of the heat resistant fabric curtain in the area between the side wall of the enclosure and the underside of the charger plate supporting frame and where, in the retracted position of the charger plate, the fold is almost horizontal. For purposes of illustration, this view indicates the angle bar at the left as being in the same plane as the bottom of the charger plate, whereas because of the slope of the charger plate, this relation is more accurately shown.

Figure 1:
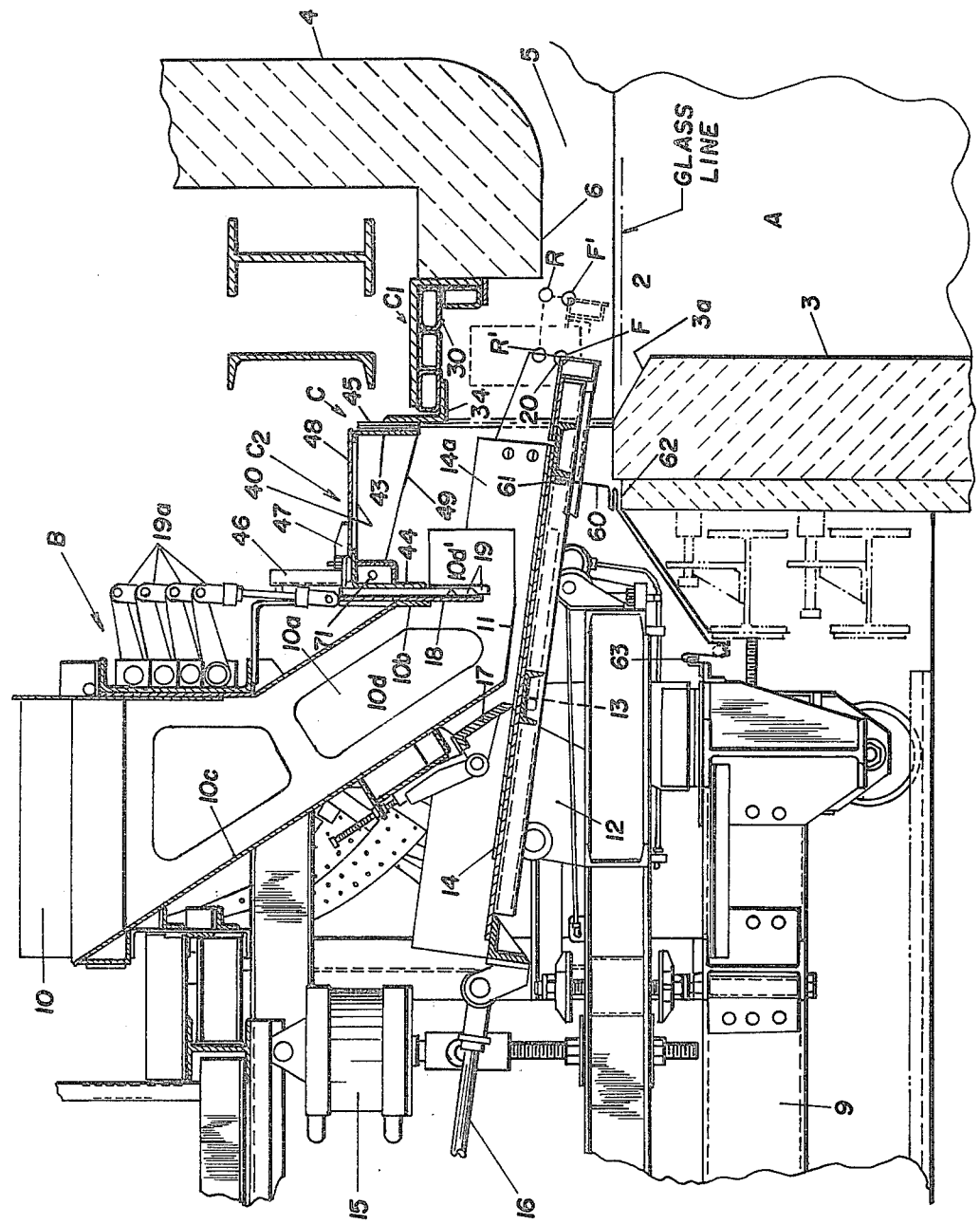
FIG. 1 shows a present preferred embodiment of the invention with the charging end of a glass furnace having a batch feeder in operative position at the end of the furnace and the enclosure of the present invention in position between the feeder and the furnace, the view being a longitudinal vertical section.

Referring first to FIG. 1, A designates generally the charging end of a glass furnace, B designates generally the batch feeder, and C is the enclosure comprising sections C1 and C2.

The charging end of the glass furnace, commonly referred to in the art as the "doghouse" comprises a tank having spaced sidewalls, only one of which, designated 2 in the drawing, is seen in FIG. 1. The back or rear end wall 3 of the tank extends between the two side walls. The inner top edge 3a of the back wall slopes downwardly from the top toward the inner face of the back wall. The normal level of molten glass in the tank is indicated by the broken line marked "glass line" in FIGS. 1 and 2.

The rear wall of the furnace enclosure above the level of the top of the tank is set forwardly of the back wall. It is designated 4 and is referred to in the art as a suspended arch since it extends from one side wall of the tank to the other above the level of the top of the tank to form an opening 5 beneath its lower edge 6 and the level of the side walls 2. As thus constructed, there is an open area above the molten glass between the rear tank wall and the suspended arch into which the raw glass batch materials are charged into the tank and where they first float on the molten glass. After one charge of batch material is deposited on the molten glass by the feeder, it is usually pushed by the batch feeder from this open area (to the right as shown in FIG. 1) under the suspended arch into the combustion enclosure of the furnace above the tank immediately forward of the back wall, as is well known in the art and forming no part of this invention. As here shown the suspended arch has a rearwardly extending ledge portion, which is also of usual construction.

The batch feeder is a so-called "blanket" feeder and is of the kind shown in our U.S. Pat. No. 3,780,889 dated Dec. 25, 1973. As shown in FIG. 1, it comprises generally a wheeled supporting frame 9 so that the feeder may be moved into or out of position at the charging end of the furnace. The frame supports a hopper 10 into which the batch materials are charged and the lower portion 10a of which comprises a discharge chute sloping toward a downwardly and forwardly open end across the top of which is a downturned flange 10b extending upwardly from the opening 11, a sloping rear wall 10c and side walls 10d with forward extensions 10d'. There is a frame designated generally as 12 below the hopper arranged to tilt about a transverse axis 13, the pivots for which are concealed by the side walls of the chute so that they are not shown in the drawing. Carried on this tilting frame there is a charger plate 14 that reciprocates beneath the bottom 11 of the chute, this plate having vertical side flanges 14a along its side edges. There is an air motor 15, or other means, for rocking the frame up and down in see-saw fashion about said pivotal axis. The charger plate 14 is, in fact, supported on rollers, not shown, for easy back and forth movement on the frame 12. The charger plate has laterally extending bottom flanges 14c, best seen in FIGS. 7 and 9. A motor driven eccentric linkage 16 reciprocates the charger plate longitudinally above the supporting plate or panel 12. There is a sand seal 17 on the rear wall 10c of the chute-like hopper. The free lower terminal of the sane seal 17 bears on the surface of the charger plate at a point practically, if not exactly, coincident with the pivoting axis of the frame, so that as the frame and the charger plate on the frame rock up and down and the charger plate moves back and forth, the edge of the sand seal will remain effectively in contact with the surface of the charger plate 14, as more fully explained in said patent.

Across the front of the chute are gate means 18, preferably comprising a number of individually vertically adjustable sections 19 extending crosswise of the feeder with linkage 19a to adjust them up and down with respect to the charger plate.

The charger plate, as shown in FIG. 1, is in its fully retracted position with its forward edge and nose portion 20 positioned over the sloping inner top edge 3a of the furnace back wall. In its cycle of operation the top edge of the nose 20 of the charger plate will be moved forward from point F to point F' and, in so doing, the nose will push a previously deposited charge of batch material floating on the surface of the molten glass under the suspended arch as previously described. As it does so, batch material in the hopper will flow down onto the forwardly moving charger plate, depositing a layer of the batch over the charger plate. Reaching point F', the platform supporting frame will rock, raising the nose of the charger plate from position F' to position R and, from there, will retract toward position R', the plate then being almost level. As the charger plate retracts, the batch material on the plate cannot move back with the plate because of the sand seal and it will be thereby crowded off the nose of the plate into the doghouse area of the glass furnace where it will float on the molten glass and start to melt. Reaching the limit of its reverse travel at R', the charger plate will then be tilted to bring its nose back to position F to repeat the cycle. The lower rear face of the suspended arch is recessed to clear the nose and side flanges of the charger plate and any batch material resting on said plate when the nose raises from position F' to position R.

All of the foregoing apparatus and method are presently known in the art but require explanation for certain parts of this invention which, as stated, pertain to the enclosure C comprising sections C1 and C2.

Section C1 of the enclosure (see particularly FIG. 2) comprises a deck portion 30 formed mainly of a plurality of flattened tubes 31 welded together and there is a similar flattened tube 32 set vertically edgewise and welded to the forward or inner edge of the group of tubes 31. There is a wide angle section 30a extending across the open end of the doghouse of the furnace with its horizontal flange or leg overlapping the innermost flat tubes 31 and its vertical leg abutting the ledge formation at the rear of the furnace. This vertical leg has a ledge at its bottom edge on which the lower edge of the tube 31 rests. Because of the intense heat to which the deck is exposed, the tubes are water cooled by the circulation of water therethrough, this being a common expedient in protecting metal structures, and specific water circulating connections have not been shown. The outer edge of the desk structure, overhanging the rear wall of the tank, comprises a structural angle section 34 having a horizontal leg of the angle over which the underface of the outermost flat tube 31 extends. The vertical leg of this angle extends upwardly.

Figure 2:
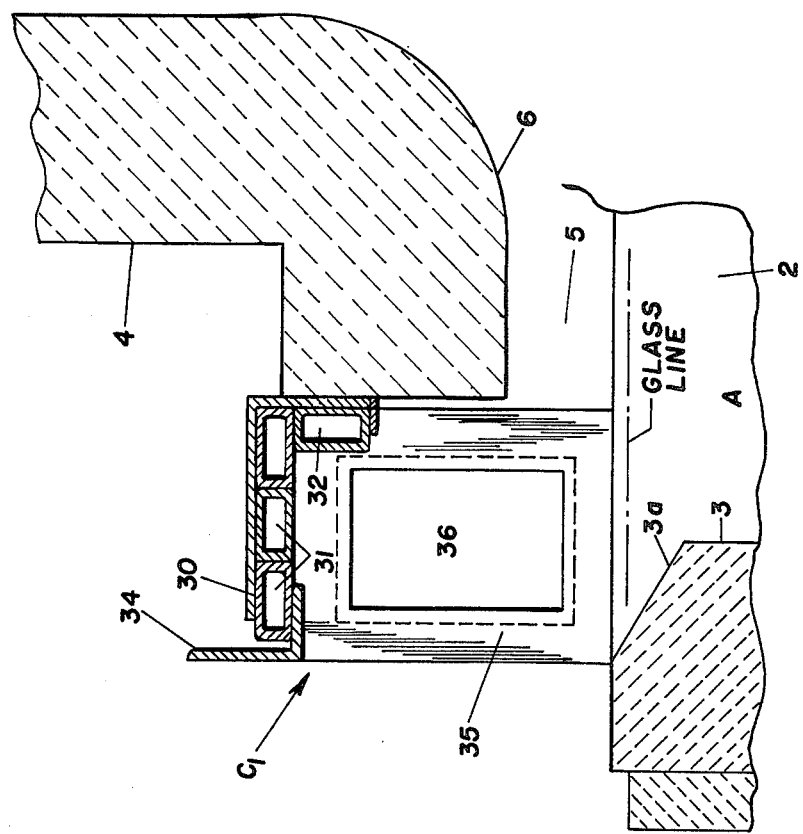
FIG. 2 is a transverse section similar to FIG. 1 showing the charging end of the furnace and the furnace mounted section of the enclosure only, the view being on a larger scale than FIG. 1.

At each end of this deck structure there is a rigid metal end plate 35. These plates are supported on those portions of the opposite side walls of the glass tank to the rear of the recessed face of the suspended arch, usually with refractory cement and/or heat resistant fibrous packing on the top wall outside of and under the end vertical plates to prevent the escape of hot gases and dust from under and around the end plates. Each end plate has a normally closed door 36 thereon which can be opened outwardly to inspect and perhaps correct some batch feed irregularity. The door is illustrated in FIG. 2 as seen from inside the enclosures.

Section C2 of the enclosure (see FIG. 1) must adapt to certain conditions quite different from section C1 and, as a result, is somewhat more complicated. The forward portion of section C2 must be of the same width crosswise of the furnace as section C1 so that it, too, is wide enough to span the distance from one side wall of the glass tank to the other. Its rear portion, however, attaches to the hopper of the feeder so that its width from side to side is substantially narrower than the forward portion. The frame or panel 12 which rocks up and down must be partially housed in this section of the enclosure, as is also the case with the charger plate 14 that moves back and forth over this tilting frame. The forward end of the charger plate extends over the rear wall of the tank so that the free escape of dust and gases must be blocked from flowing out under the charger plate to the atmosphere, and the mechanism of the feeder must be protected against the outflow of gases at the rear of the enclosure C2 without interfering with the back and forth and up and down movement of the charger plate.

Figure 4:
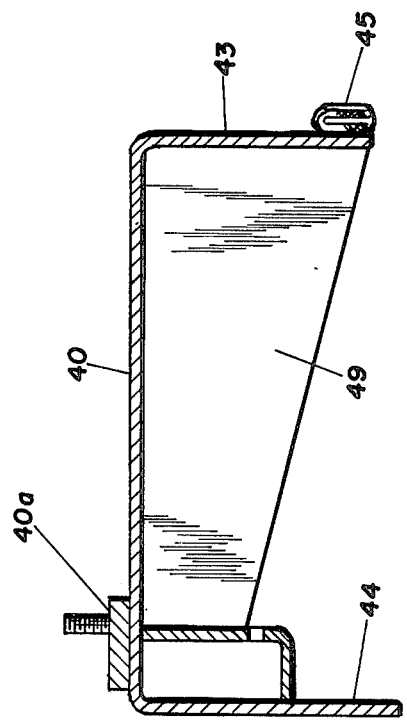
FIG. 4 is a single transverse section through enclosure member of FIG. 3, the view being in the plane of line IV—IV of FIG. 3.

Referring first to FIGS. 3 and 4, which show the section C2 removed from the feeder, FIG. 3 is a plan view and FIG. 4 is a simple transverse section in the plane of line IV—IV of FIG. 3. FIG. 3 shows the member C2 foreshortened by the removal from the figure of that portion of the structure between the broken lines. There is a flat deck plate 40 coextensive in length with section C1 of the enclosure. There is an end panel 41 at each end of the deck 40 and these panels meet edge to edge with the end panels 35 of section C1 when the two sections are together, although the end panels 41 are longer vertically than the panels 35 so that the deck 40 is at a level higher than deck 30 of FIG. 2. The lower edges of the end panels 41 are secured to and supported by angle bars 42 extending forwardly from the underframe of the feeder.

The deck 40 has a downturned front flange 43 extending along its full length, as shown in FIG. 1, which confronts the upturned leg 34 of the angle at the rear edge of section C1 when the two sections are together. There is a similar downturned flange 44 along the rear edge of deck 40 so that intermediate its ends, at the plane of line IV in FIG. 3, the top deck is in effect an inverted transverse U-shaped section. However, as seen in FIG. 3, the two rear corners of the deck are cut away so that the rear flange 44 is not the full length of the deck or as long as front flange 43, but it is substantially the full width from side to side as the width of the hopper 10 and chute portion 10a of the feeder.

There are doors 48 at intervals along the deck 40 which are hinged to the deck at 47 and each door has a handle 48a so that an operator standing on the deck may open the door to check the rate of feeding of the batch mixture at intervals across the length of the deck. To reinforce the deck 40 against the weight of an operator standing or walking thereon, there are gusset plates 49 (see FIG. 4) extending crosswise of the deck at intervals along its underside. A strip 40a along the top rear edge of the deck 40 has inverted bolts that extend upwardly to which hangers 46 are secured for hanging the enclosure section C2 to the supporting plate 46a at the front of the hopper.

Figure 6:
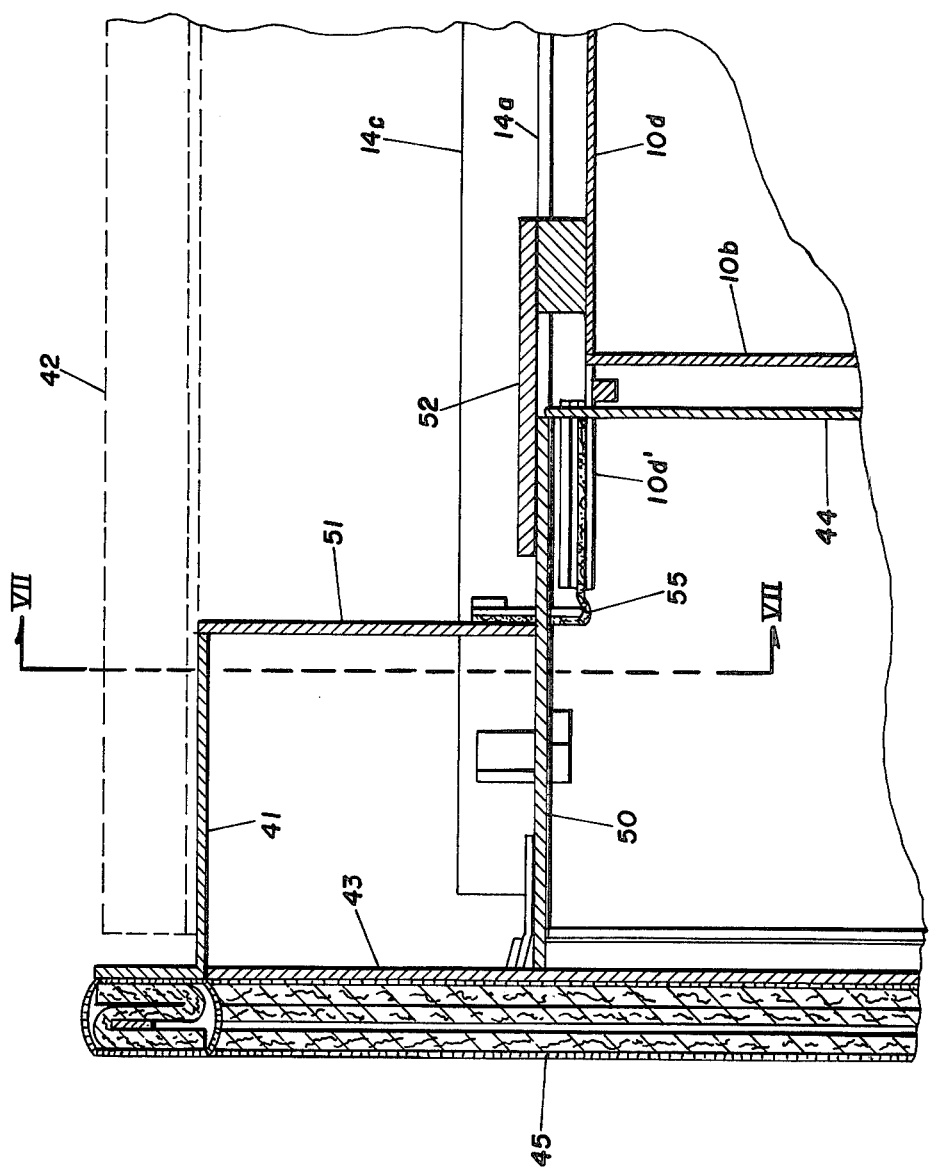
FIG. 6 is a fragmenatry horizontal section across the corners of the enclosure and forward end of the hopper of the feeder, the view being substantially in the plane of line VI—VI of FIG. 5 and showing the heat resistant fabric but which, for clarity, has been omitted from FIG. 5.

There is a heat-resistant, somewhat compressible packing 45 across the entire length of flange 43, which also extends down the face of each of the end plates 41, there plates, as shown in FIG. 3 and FIGS. 5 and 6, having outwardly turned flanges to which this packing is secured. The purpose of this packing is to form a seal between sections C1 and C2 when the feeder is positioned to charge batch material into the doghouse of the furnace and accommodate for any slight misalignment while blocking the escape of hot gases and dust from between the two sections.

FIG. 5 is a section similar to FIG. 4 showing the complete enclosure section C2 at the front of the feeder, but with the charger plate removed. The dotted line A—A indicates the approximate slope and location of the bottom of the charger plate in the position in which it is shown in FIG. 1. This view shows the relation of the section C2 with relation to the hopper of the feeder, but with the vertically adjustable feed gates 19 and their adjusting rods and linkages omitted.

FIGS. 5 and 6 show the relation of the enclosure section C2 with reference to the hopper of the feeder. Each cut away corner has what may be termed a recessed partial end plate panel 50 that extends forwardly from the downturned flange 44 to the front flange 43, but the lower edge of which does not, at least as here shown, extend further below the level of the deck than does flange 44. Because of the cut away corners, these panels are recessed from but parallel with their respective end panels 41. There is also at each end a rearwardly facing panel 51 closing the space between the rear edge of the end panel 41 and the recessed panel 50 (see FIG. 3).

As clearly seen in FIG. 5 in conjunction with FIG. 1, the downturned rear flange 44 of the deck terminates about even with the downturned flange 10b of the feed hopper so that a space is provided between them to receive the upper edges of vertically adjustable gates and their upwardly extending operating connections. These gates and connections substantially block the outflow of gases between said spaces while material in the hopper closes the discharge opening 11 of the chute against the outflow of gases and dust at the level below flange 44 and above the charger plate.

A coupling bar 52 (see FIG. 3) on the outer face of each recessed end panel 50 is arranged to be bolted to the side walls of the hopper through an interposed spacer to also secure the enclosure section C2 firmly in place and, in conjunction with hangers 46, prevent possible movement of the enclosure section C2 with the up and down and back and forth movement of the charger plate.

Figure 7:
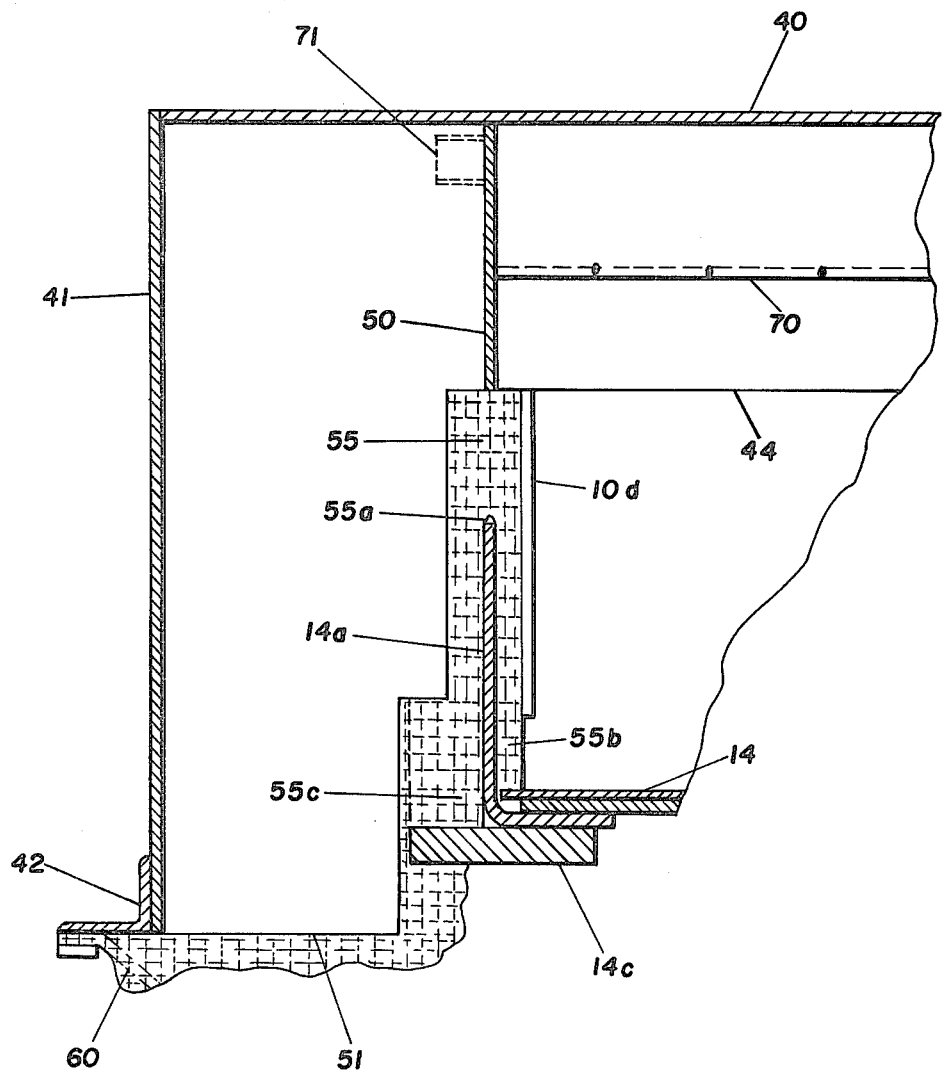
FIG. 7 is a fragmentary vertical section through the feeder-mounted section of the enclosure in the plane of line VII—VII of FIG. 6 looking toward the rear to show in front elevation the inside corner area which, in FIG. 6, is shown in horizontal section.

The charger plate has a vertical side wall 14a along each edge and FIGS. 6, 7 and 8 show this side wall at one side of the machine which, of course, is duplicated at the other side of the machine.

Both FIGS. 6 and 7 and also FIG. 4 are on a larger scale than FIG. 5. FIG. 6 is a fragmentary horizontal section of one corner of the enclosure where down-turned flange 10b at the front of the hopper confronts downturned flange 44 of the enclosure but is spaced therefrom to provide a space for the vertically adjustable gates and their operating connections as previously described. FIG. 7 is a transverse section in about the plane of line VII—VII of FIG. 6 looking face-on into the corner shown in FIG. 7. FIG. 8 is a section similar to a portion of FIG. 5 but looking into the enclosure as if the recessed side plate 50 were removed, showing the side of the charger plae and its support in elevation.

Since the hopper discharges into the charger plate, the side flanges 14a of the charger plate extend alongside of but close to the outer side walls 10d of the chute extension of the hopper. This is seen particularly in FIGS. 6 and 7 where one corner of the front side wall 10d of the hopper terminates close to the inner face of the side flange 14a of the charger plate 14, the flange of the charger plate, of course, being parallel with the side wall 10d of the hopper. To more effectively seal the enclosure where the side flange 14a of the charger plate passes between the inner edge of wall 51 and outside side wall 10d of the hopper directly below the recessed end plate 50, a heat resistant piece of fabric 55 is clamped to the face of the upper corner area of the flange 44 and backing strips 55a. The forward edge area of this fabric bends at right angles (see FIG. 6) around the corner outwardly to lie flat against the outer or rear face of panel 51. This outwardly turned edge of the fabric has stiffener strips thereon and a narrow metal clamping strip screwed onto the outer face of plate 51 holds it in the position shown. The fabric may be replaced from time to time if necessary.

As seen in FIG. 7, The fabric 55 is slit vertically at 55a to straddle the side flange 14a of the charger plate (here seen in highest position) so that the side flange may move up and down as it slides back and forth, the part 55b of the fabric projecting down into the tray and the part 55c contacting the outside of the side wall 14b. Part 55c extends down onto the flange 14c of the support for the charger plate and the fabric is slit at the corner so that part 55c can flex up and down as the flange 14c of the support moves up and down and the lower right corner of wall 51 is cut away to accommodate such movement. In these figures, 10d' is the forwardly extending side wall of the hopper that extends forward beyond the plane of the adjustable gates as seen in FIG. 1.

The opposite corner of the charger plate and enclosure are similarly formed but directions, left to right, are of course reversed.

To complete the enclosure there is clamped to the undersurface of the supporting tray the upper edge of a fabric curtain 60. The upper edge of this curtain extends across the full width of the charger plate to which its upper edge is clamped by sectional clamping strips 31 and extends beyond the charger plate to the sides 41 of the enclosure section C2 where its upper edge is turned horizontally and clamped against the angle bars 42 at the outermost edges of the curtain. Thus it extends as a continuous curtain under the charger plate, to which its upper edge is fastened, from one enclosure side wall 41 to the other. Since the tray rocks up and down and back and forth at this point, the curtain cannot extend straight across from the supporting tray to the fixed fastening at the lower edge of panel 41 but is made loose and "full" between the movable tray and fixed side walls 41 and the bars 42. Thus fabric ideally is folded or pleated in a fore-and-aft direction as shown in FIG. 9, whereby the fabric can unfold and fold as the supporting tray rocks and flex sideways with the back and forth travel of the charger plate. Below the tray, the curtain is gathered in two or three folds on a recessed ledge 62 at the outer side of the back wall of the tank. It then preferably rests on a sheet metal plate as it slopes down to be secured to the feeder underframe at 63.

Since the upper edge of the curtain is in a vertical plane to the rear of plate 51, as viewed in FIG. 7, which is to the left of 51 in FIG. 9, gases that might otherwise flow over the side flange 14a and under the recessed end plate 50 would merely return to the enclosed doghouse area under the enclosure. Asbestos fabric has been considered for this purpose but, because of the health hazards associated with asbestos where particles or strands may escape into the surrounding work area, a high temperature resistant fabric sold under the name "Refrasil" has been endurance tested in actual use for endurance in the areas of the enclosure where it is employed and found satisfactory and safe for long enough periods of time to be satisfactory.

Under the deck 40 of section C2 along the rear flange, a duct 70 is formed across the full width of the enclosure into one end of which an air supply pipe at 71 (FIG. 1) opens. As best seen in FIG. 7, this duct has openings at spaced intervals along its length for the discharge of air into the enclosure when it is in use to maintain a slight positive pressure under the hood and reduce the "chimney" effect of the cooling, and thus the contracting of gases within the enclosure, and thereby deter the outflow of gases from the charging area and dilution of room air with gases which is very substantially reduced but perhaps not completely eliminated by the enclosure as herein provided. In some cases, calking with heat resistant fibers or fabric or the securing of additional metal sheets may be necessary, the structure here shown being specifically adapted for use with one type of blanket feeder, but various feeders and different furnaces may require some particular alteration while, however, embodying the general arrangement here shown.

It may also be mentioned that in the foregoing description we have treated the feeder as a unit whereas, with large furnaces, such as twenty or more feet in width at the charging end, two or more commercial feeders may be arranged side by side, as explained in the aforesaid patent, to perform as a single unit.

We claim:

1. For use in the combination of a glass melting furnace having a charge receiving end with a tank back wall with a suspended arch structure over the tank forwardly of the back wall providing an upwardly opening charge receiving area between the back wall of the tank and the suspended arch, and a batch feeder with a charger plate movable from a position above the back wall of the tank downwardly and forwardly to push previously charged but unmelted batch materail in the tank under the suspended arch into the furnace, the charger plate being movably supported on an underlying tilting frame, the feeder and tilting frame being then arranged to raise the charger plate to a more nearly level position and retract it while discharging batch material into the tank through the upwardly opening charge receiving area, the area from which the preceding batch has been pushed, the charger plate upon reaching a retracted limit of travel then being lowered to repeat the foregoing cycle, the feeder having a hopper that delivers batch material to the charger plate, the invention comprising an enclosure for the charge receiving end of the furnace and the charge delivery end of the feeder, the enclosure comprising:

(a) a feeder-supported section forming with said hopper and front of the feeder an enclosure above the feeder plate and at the back and sides but open at the front, extending said feeder-supported section above the charger plate beyond the hopper a sufficient distance to extend over said rear tank wall of the furnace when the feeder is in operating position at the charging end of the furnace, said section comprising a deck with depending end walls;

(b) a furnace-supported section forming with the suspended arch structure of the furnace an enclosure over the top and sides of the upwardly opening charge-receiving area, having a deck and end walls extending rearwardly from the suspended arch structure of the furnace and having its end walls supported on the sides of the furnace tank rearwardly toward the back wall of the tank and with the rear vertical edges of the end walls in confronting relation to the forward edges of the end walls of the feeder-supported section, the decks of the two sections being coextensive from side to side;

(c) the decks of the two sections having confronting flanges coextensive with their length;

(d) the decks of the two sections being sufficiently high above the charger plate of the feeder to clear the feeder plate for its up and down travel.

2. The enclosure defined in claim 1 wherein the deck of the feeder-supported section is above the level of the furnace-supported section, the deck of the feeder-supported section having a depending flange acorss its forward edge and the deck of the furnace-supported section having an upturned flange across its rear edge in confronting relation separably sealed against the downturned flange of the feeder-supported section in such manner that the feeder may be moved if necessary away from the furnace-supported section.

3. The enclosure defined in claim 2 wherein there is a heat-resistant packing across the vertical front edges and the outer face of the flange of the feeder-supported section against which the confronting surfaces of the furnace-mounted section make sealing contact when the two sections are together with the feeder in operating position at the rear of the tank back wall.

4. The enclosure defined in claim 2 wherein there is a heat-resistant flexible curtain secured to the undersurface of the charger plate of the feeder and the end walls of the feeder supported mounted section being engaged with the back wall of the tank in a manner to substantially prevent the flow of gases from within the enclosure through the space under the charger plate and its tilting frame and above said back wall of the tank while flexing with the tilting and forward and reverse travel of the charger plate relative to said end walls and the back wall of the tank.

5. The enclosure defined in claim 1 or 4 in which the respective feeder-supported and furnace-supported sections are separate from each other, whereby the enclosure is completed only when the feeder is in operative position at the charging end of the furnace.

6. The enclosure defined in claim 1 in which there is a flexible curtain means attached to the underside of the tilting and reciprocating charger plate of the feeder and draped to engage the rear wall of the tank and secured also to the end walls of the feeder-supported enclosure section arranged to flex with the up-and-down and back-and-forth movements of the charger plate in such manner as to substantially block the outflow of gases and dust from the feeder-supported enclosure section in the area above the rear wall of the tank and the underside of the charger plate of the feeder and the end walls of the feeder-supported enclosure section, the arrangement being such that the batch material in the hopper itself blocks the outflow of gases through the hopper.

7. The enclosure defined in claim 1 wherein the charger plate of the feeder has side flanges that move back and forth and up and down with the charger plate, and wherein the width of the deck from one end to the other is reduced to provide working clearance for side flanges of the charger plate outside the respective sides of the hopper where it feeds batch material onto the charger plate and provide clearance for the tilting movement of the charger plate and its supporting panel, and a flexible heat resistant fabric at the back of the enclosure over each flange of the charger plate, the fabric being slit vertically to receive said flanges and form a flexible seal where the flanges of the charger plate pass from within the enclosure and extend alongside the hopper of the feeder to the rear of the enclosure.

8. The enclosure defined in claim 1 wherein a duct is provided under the deck of the feeder-mounted enclosure section for the introduction of air under pressure into the enclosure to provide a slightly elevated pressure within the enclosure when the two enclosure sections are together and the feeder is operating.

9. In the combination comprising a glass melting furnace having a tank with side walls and a rear wall joining the side walls at the rear end thereof with a suspended arch and doghouse area arranged to provide an open charge-receiving area at the rear end of the tank and having a furnace enclosure forwardly of the suspended arch and charge receiving area and a batch feeder movable into charge feeding position where it discharges batch material into said open charge receiving area, the feeder having a feeder means extending forwardly from a batch containing hopper at a level to clear the back wall of the tank to discharge batch material therefrom into the furnace, the invention comprising an enclosure arranged to substantially reduce the escape of furnace gases and dust when the feeder is charging batch material into the furnace, wherein the enclosure comprises:

(a) a first section having a deck with depending side walls at each end arranged to set on the side walls of the furnace with the deck extending from side to side above the open charge receiving area and extend from the suspended arch rearwardly to the back wall of the furnace tank;

(b) a separate complementary second enclosure section mounted on and supported by the feeder and comprising a deck coextensive in length with the deck of the first section and a depending end wall at each end, the forward edges of which meets the rear edges of the first section when the feeder is in batch feeding position at the rear end of the tank with the rear of said second section being closed against the structure of the feeder on which it is supported, the two sections then forming a complete enclosure over the area into which dust and gases escape when the furnace and feeder are operating; and (c) means attached to said feeder extension extending across the width of the enclosure and depending from the extension and from the end walls of saidd second feeder section to substantially block the escape of gases and dust from below said feeder extension and the rear wall of the tank.

* * * * *